US009612687B2

(12) United States Patent
Powell et al.

(10) Patent No.: US 9,612,687 B2
(45) Date of Patent: Apr. 4, 2017

(54) AUTO-ALIGNED ILLUMINATION FOR INTERACTIVE SENSING IN RETRO-REFLECTIVE IMAGING APPLICATIONS

(71) Applicant: Microsoft Corporation, Redmond, WA (US)

(72) Inventors: Karlton Powell, Lake Stevens, WA (US); John Lutian, Kirkland, WA (US); Timothy Large, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 358 days.

(21) Appl. No.: 14/321,709

(22) Filed: Jul. 1, 2014

(65) Prior Publication Data

US 2016/0005219 A1    Jan. 7, 2016

(51) Int. Cl.
*G06T 15/50* (2011.01)
*G06F 3/042* (2006.01)
*G02B 19/00* (2006.01)
*G02B 5/32* (2006.01)
*H04N 13/02* (2006.01)
*H04N 13/04* (2006.01)

(52) U.S. Cl.
CPC .............. *G06F 3/0425* (2013.01); *G02B 5/32* (2013.01); *G02B 19/009* (2013.01); *H04N 13/0239* (2013.01); *H04N 13/04* (2013.01)

(58) Field of Classification Search
None
See application file for complete search history.

(56) References Cited

U.S. PATENT DOCUMENTS

| | | | |
|---|---|---|---|
| 2001/0013960 A1* | 8/2001 | Popovich | G02B 5/32 359/15 |
| 2008/0198451 A1* | 8/2008 | Gohman | G02B 15/177 359/432 |
| 2011/0261164 A1* | 10/2011 | Olesen | G01N 15/1475 348/46 |
| 2012/0224388 A1* | 9/2012 | Lin | G02B 6/0036 362/607 |

(Continued)

OTHER PUBLICATIONS

Valkov et al.; "Touching Conference of EuroVR Floating Objects in Projection-based Virtual Reality Environments;" Jan. 2010; Joint Virtual Reality Conference of EuroVR—EGVE—VEC 2010; p. 1-9.*

(Continued)

*Primary Examiner* — Peter Hoang
(74) *Attorney, Agent, or Firm* — Turk IP Law, LLC (57) ABSTRACT

Interactive sensing in retro-reflective imaging systems may be enabled through auto-alignment of an infrared (IR) illumination region with a floating image region by transmitting IR light, added on or within a display, through the same optical path as the visible floating image light. The IR illumination at the display may be either a flood of light or structured light. In some implementations, stereo vision based imaging techniques may be employed in conjunction with an auto-aligned IR floating image to provide illumination for a stereo imaging system and to provide position sensing for interaction.

17 Claims, 11 Drawing Sheets

(56) References Cited

U.S. PATENT DOCUMENTS

| | | | | |
|---|---|---|---|---|
| 2012/0268427 A1* | 10/2012 | Slobodin | ................ | G06F 3/042 345/175 |
| 2013/0120816 A1* | 5/2013 | Yoon | ....................... | G03H 1/04 359/19 |
| 2013/0155723 A1* | 6/2013 | Coleman | ............. | G02B 6/0018 362/621 |
| 2013/0300637 A1* | 11/2013 | Smits | .................... | G03B 35/18 345/8 |

OTHER PUBLICATIONS

Valkov et al., "2D Touching of 3D Stereoscopic Objects", CHI 2011, May 7-12, 2011, Vancouver, BC, Canada, pp. 1-10.
Yousif et al., "3D Registration in Dark Environments Using RGB-D Cameras", 2013 International Conference DICTA, p. 1-8, Nov. 26-28, 2013.

\* cited by examiner

FIG. 8

AUTO-ALIGNED ILLUMINATION FOR INTERACTIVE SENSING IN RETRO-REFLECTIVE IMAGING APPLICATIONS

DETAILED DESCRIPTION

According to some implementations, methods for interactive position sensing in retro-reflective imaging applications are described. An example method may include determining an optical path of light forming a floating image on a display plane, and providing infrared (IR) illumination to the display plane through the optical path to automatically align a region of the IR illumination and a region of the floating image. The example method may further include providing position sensing of the floating image through a sensor employing stereo vision to enable user interaction with the floating image in response to the sensor detecting the aligned region of the IR illumination.

A two-dimensional (2D) or three-dimensional (3D) floating image may be generated by non-powered optic elements by using a retro-reflective array and a beam splitter, along with a lighted object. Techniques to provide interactive sensing of floating images from a computer display may rely on physical alignment of a sensor to the floating image plane. Misguided registration of a sensing plane to the floating image plane may occur when employing these techniques.

Interactive sensing in retro-reflective imaging systems may be enabled through auto-alignment of an infrared (IR) illumination region with a floating image region by transmitting IR light, added on or within a display, through the same optical path as the visible floating image light. The IR illumination at the display may be either a flood of light or structured light. In some implementations, stereo vision based imaging techniques may be employed in conjunction with an auto-aligned IR floating image to provide illumination for a stereo imaging system and to provide position sensing for interaction.

These and other features will be apparent from a reading of the following detailed description and a review of the associated drawings. In the following detailed description, references are made to the accompanying drawings that form a part hereof, and in which are shown by way of illustrations specific implementations or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
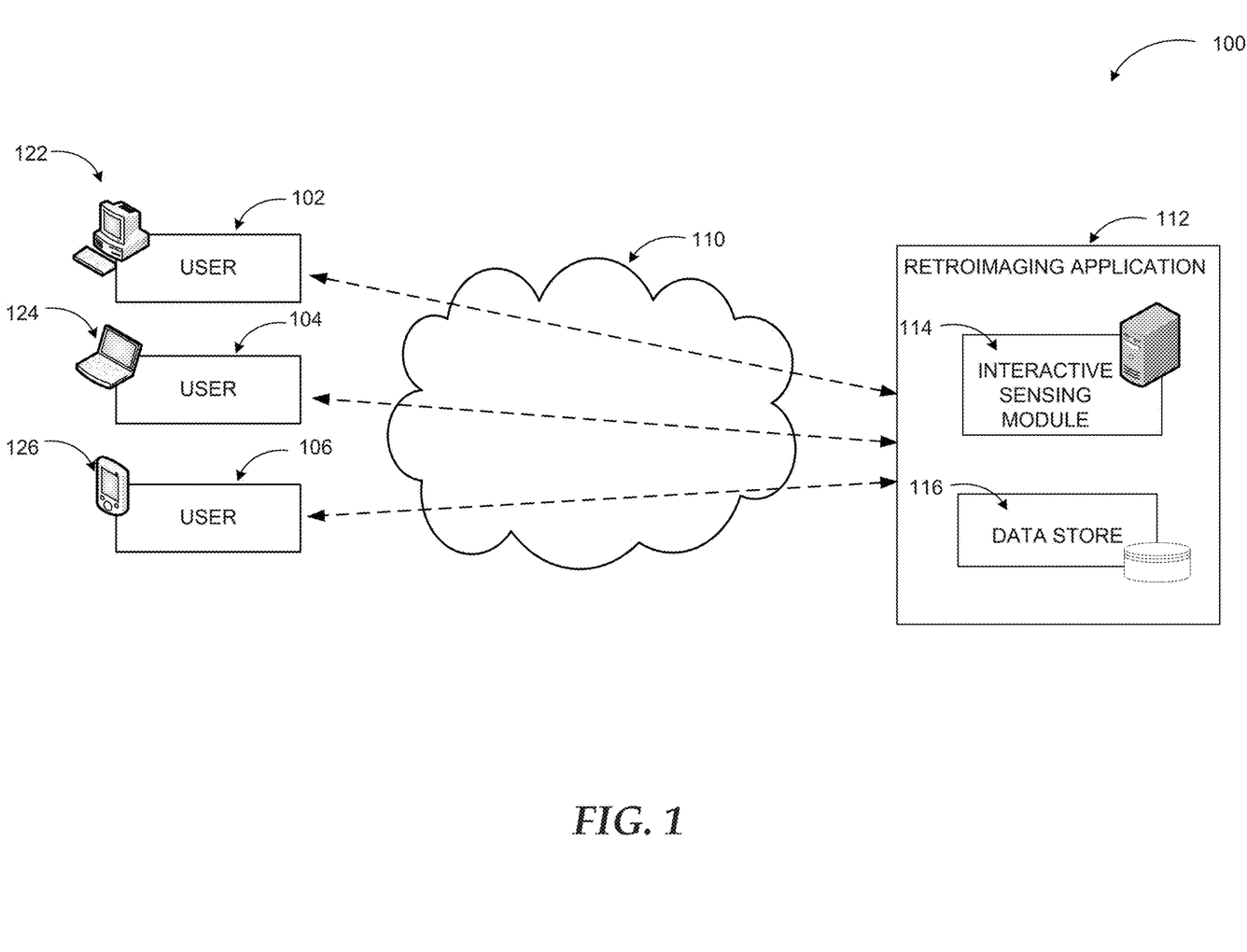
FIG. 1 includes a conceptual diagram illustrating an example networked environment, where auto-aligned IR illumination in conjunction with stereo vision may be implemented to enable interactive sensing for floating images.

FIG. 1 includes a conceptual diagram illustrating an example networked environment, where auto-aligned IR illumination in conjunction with stereo vision may be implemented to enable interactive sensing for floating images.

As demonstrated in diagram 100, one or more users (102, 104, and 106) may access an application, such as a retro-reflective imaging application 112 that may include an interactive sensing module 114, over a cloud-based network 110. The retro-reflective imaging application 112 may be hosted at a remote server, and may be accessed through a user's client device over the cloud-based network 110. A local version of the retro-reflective imaging application 112 may also be locally hosted at the user's client device, and data associated with the local retro-reflective imaging application 112 may be retrieved over the cloud-based network 110. Some example client devices may include a desktop computer 122, a laptop computer 124, a smart phone 126, a car phone, a mobile phone, a tablet, and/or a home automation device.

An example retro-reflective imaging application 112 may include an interactive sensing module 114. The interactive sensing module 114 may be configured to provide infrared (IR) illumination from the illumination source to the display plane through the optical path to automatically align a region of the IR illumination and a region of the floating image, and provide position sensing of the floating image through the one or more sensors employing stereo vision to enable user interaction with the floating image in response to the one or more sensors detecting the aligned region of the IR illumination. The interactive sensing module 114 may also enable re-convergence of the IR illumination and visible display content at a common floating image plane through the automatic alignment of the region of the IR illumination and the region of the floating image.

Different types of data associated with the retro-reflective imaging application 112 and the interactive sensing module 114 such as sensor data, image data, position data, and other similar data may be received from the retro-reflective imaging application 112 and interacted with at the user's client device. Data associated with the retro-reflective imaging application 112 may be hosted at the data store 116 associated with the retro-reflective imaging application 112. The data store 116 may retrieve and store data as requested by the retro-reflective imaging application 112, including applications locally executed on individual client devices across a network, such as the cloud based network 110.

The example networked environment in FIG. 1 has been described with specific applications, modules, and module tasks. Implementations are not limited to the networked environment according to this example configuration. Enablement of interactive position sensing by employing auto-aligned IR illumination in conjunction with stereo vision may be implemented in configurations employing fewer or additional components, and performing other tasks. Furthermore, enablement of interactive position sensing by employing auto-aligned IR illumination in conjunction with stereo vision may be implemented in a similar manner using the principles described herein.

Figure 2:
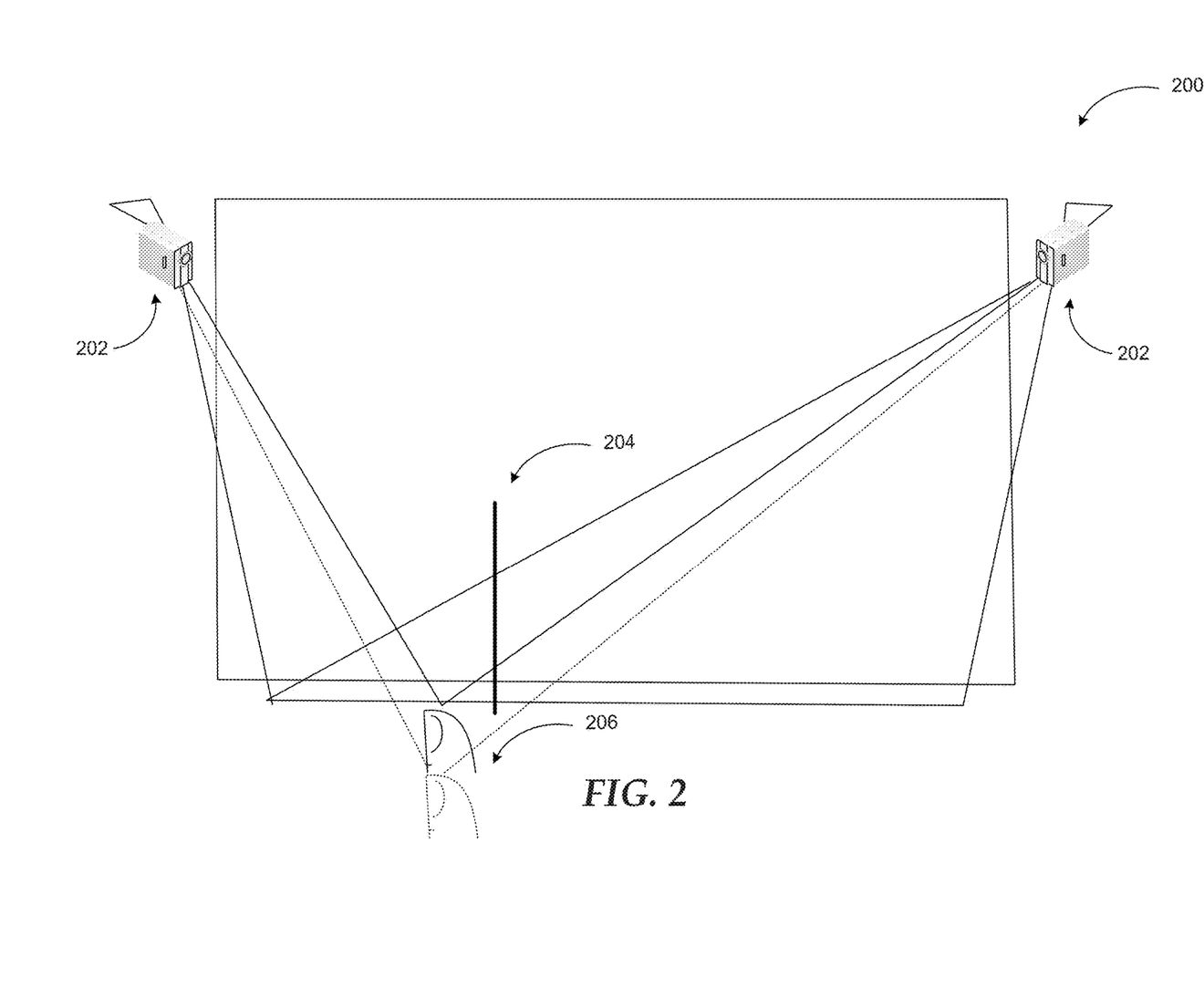
FIG. 2 illustrates two or more example interactive sensors employing stereo vision in conjunction with auto-aligned IR illumination to enable interactive sensing for floating images.

FIG. 2 illustrates two or more example interactive sensors employing stereo vision in conjunction with auto-aligned IR illumination to enable interactive sensing for floating images.

Diagram 200 includes a top plan view so as to show z-movement of finger 206 into and out of floating image plane 208 by the left-right movement shown. A floating image 204 may be projected on a reconvergent display plane of a computing device. IR illumination may be automatically aligned with a region of the floating image 204 by projecting IR light in a same optical path of light forming the floating image 204 on the display plane. In response to detection of the IR illumination, one or more sensors 202 of the computing device may be configured to employ stereo vision in conjunction with the IR illumination to enable user interaction (finger 206) with the floating image 204 through position sensing. The sensors 202 may be traditional lenses, lenses that employ off-axis imaging, or lenses that employ linear imaging.

Stereo vision may include a variety of lens optics in order to achieve position sensing, however, for systems with relatively tight placement of the optics, especially in a small volume such as a tablet or wearable computer scenario, high angles may be involved in the imaging, and the images may appear substantially distorted. While distortion may be corrected in post processing via software, in some implementations, imaging schemes involving use of offset-imaging either including transmissive or reflective optics, the Scheimpflug principle, or rectilinear imaging (such as a Theia lens) may be used.

In further implementations, structure may be added to a flood or blanket IR image for proximity detection using spatial frequency content in a piecewise manner over the image field of view (FOV). Thus, content, which may include periodic or pseudo-random features such as lines or dots, may be in focus near a floating image plane.

Figure 3:
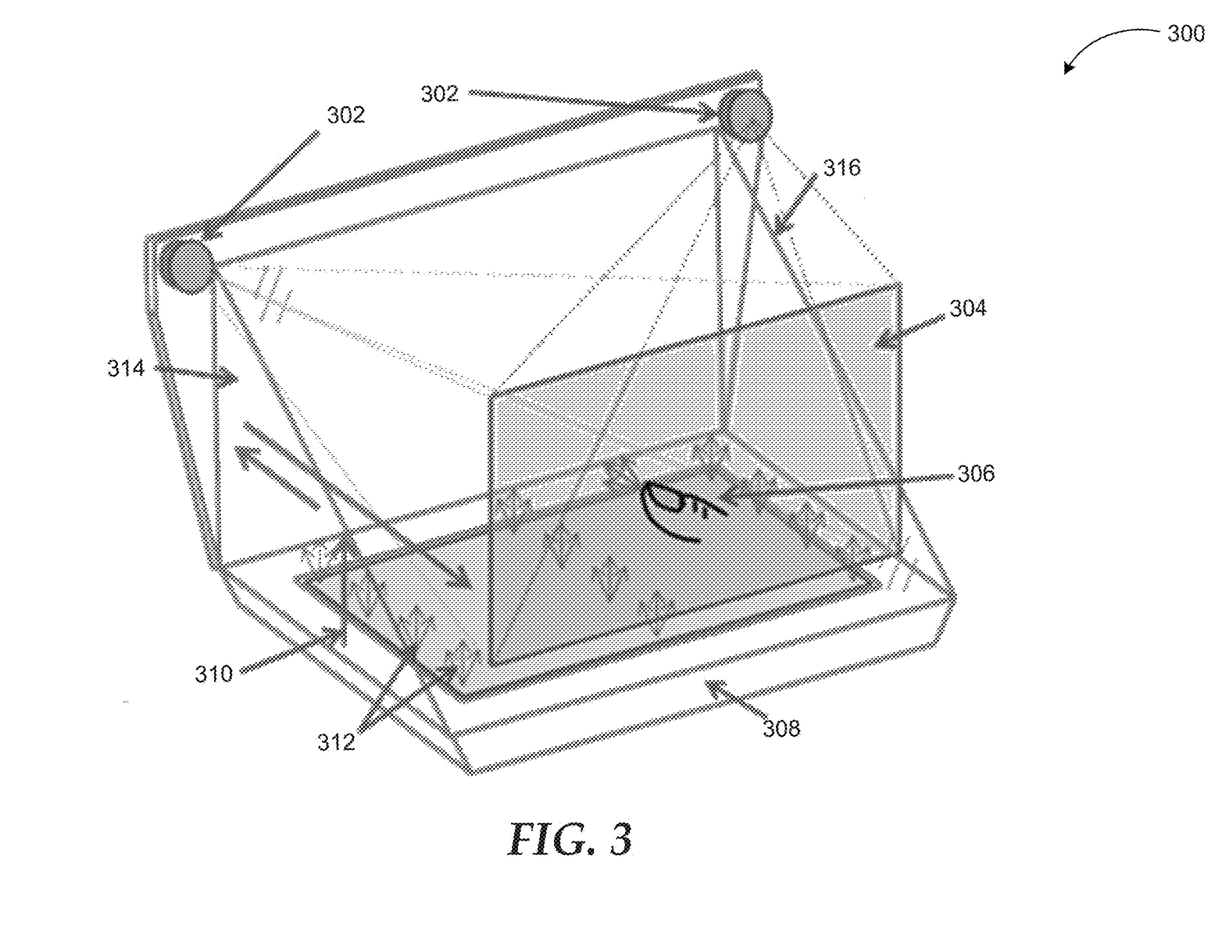
FIG. 3 illustrates two or more example cameras employing stereo vision in conjunction with auto-aligned IR illumination to enable interactive sensing for floating images.

FIG. 3 illustrates two or more example cameras employing stereo vision in conjunction with auto-aligned IR illumination to enable interactive sensing for floating images.

In diagram 300, a display panel 308 of a computing device may project a floating image 304 using a retro-reflective array 314 and a beam splitter 316. IR illumination may be automatically aligned with a region of the floating image 304 by projecting IR light 312 in a same optical path 310 of light forming the floating image 304. In response to detection of the IR illumination, one or more sensors 302 of the computing device may be configured to employ stereo vision in conjunction with the IR illumination to enable user interaction 306 with the floating image 304 through position sensing.

The projected IR light 312 may be provided to flood the display or in a structured manner. The structured light may be structured in position space, such as at the display object/image plane, or in angle space, such as laser light interacting with a random surface, diffractive optical elements (DOE), or a hologram to generate diffraction orders emanating angularly in space.

Structured light in position space may be achieved without causing artifacts to the display light by making use of inks having IR absorbing dyes printed on a layer over the IR illuminator in a plane in close proximity to the object display content plane corresponding to the floating image. Such structure across position may allow for increased sensitivity to defocus near the floating image plane by allowing structured light to blur to a peak irradiance that may be a fraction of the peak irradiance seen by structured light imaged into cameras. This may increase sensitivity to focus near retro-imaged plane slightly more than flood light alone. Structured light in angle space may be generated by making use of an IR laser, such as a beam and DOE placed near top center and emanating an angular output, divergent laser beam interacting with a hologram placed either at beam splitter or over display, or a holographic flat lens projecting an IR pattern in angle space, whether telecentric, convergent or divergent. The latter case may be masked to provide commonality with the display image.

Some implementations may include a method of alignment of a 3D vision system (which may include its own IR illumination) with a floating image. An operator may adjust or shift the edge or corner locations of a 3D sensor FOV in an iterative manner to closely match the floating image. However, by forming a board which matches the object size of screen at object plane, and moving the board to a position in proximity to the floating image having the highest contrast, a single image of the 3D sensor may be used to capture alignment dimensions of the floating image in the volume near and including the floating image. Further, automation of detectors may be used to find the corners of the floating image, and thus enable indication of floating image size, shape, and corners by a single image or multiple images using the fixed 3D sensor. In such a manner, even a 3D sensor may be aligned or calibrated to an actual floating image by direct use of the floating image itself, even for the scenario of only having white or visible light within and comprising the floating image.

Figure 4:
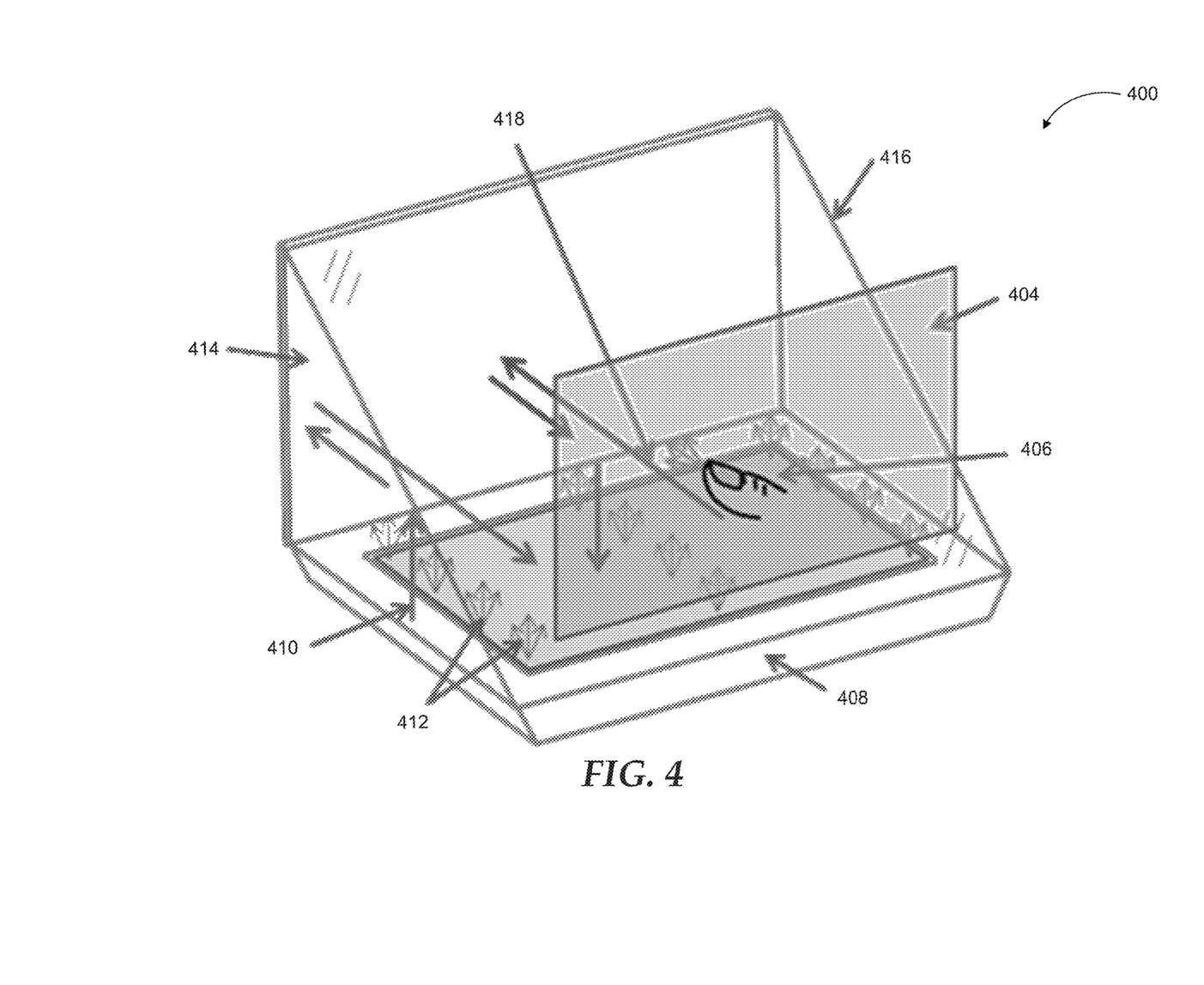
FIG. 4 illustrates an example sensor-in-pixel (SIP) display panel employing in-cell vision in conjunction with auto-aligned IR illumination to enable interactive sensing for floating images.

FIG. 4 illustrates an example sensor-in-pixel (SIP) display panel employing stereo vision in conjunction with auto-aligned IR illumination to enable interactive sensing for floating images.

In diagram 400, a sensor-in-pixel (SIP) display panel 408 of a computing device may project a floating image 404 using a retro-reflective array 414 and a beam splitter 416. IR illumination may be automatically aligned with a region of the floating image 404 by projecting IR light 412 in a same optical path 410 of light forming the floating image 404. In response to detection of the IR illumination, the sensor-in-pixel (SIP) display panel 408 may be configured to employ stereo vision in conjunction with the IR illumination to enable user interaction 406 with the floating image 404 through position sensing. Sensor in pixel (SIP), an in-cell technology, uses a grid array of sensors typically facing outward so as to detect light energy diffusely reflected back from an object to sensing layer containing the grid array of sensors. In the case of having a retro-reflection setup above such a type display panel equipped with sensing grid layer, the illumination from the display object plane follows the path of the floating image, is then diffusely reflected back toward retro-reflection path in reverse, and is then detected at the sensing grid layer. The sensing grid layer may be spectrally filtered or have a response in the near IR, such that floating touch objects such as fingers are imaged and sensed near the originating display and illumination object plane.

Such setup using SIP can display and sense within the same panel, thus not requiring added stereo vision components.

By providing IR illumination at the object display plane, both IR illumination as well as visible display content may be re-converged at a common floating image plane. Thus, auto-alignment of the IR illumination with the visible floating image display light may be achieved. As discussed above, the IR illumination may be a flood of light or may be structured across position by use of absorbing IR dye ink printed on a layer over the IR illumination. In some implementations, the IR may be added within the backlight unit (BLU) of the display module, by either interstitial placement of both IR and white light emitting diodes (LEDs) on a common delivery light guide or a separate guide for both white LEDs and IR LEDs. The latter example may be used either on the display or within the BLU stack.

If structured light in angle space is desired in conjunction with the auto-aligned illumination, it may be added through different approaches, including lasers interacting with random surface relief, diffractive optical elements (DOEs), holograms, or projection of an angular emanating pattern using a hologram or a holographic flat imager. If the structured light in angle space is desired instead of the flood or position-dependent structured light, the scenario of using a hologram plate (at beam splitter) or a flat holographic imager (with guided and projected input) may be used to retain some aspect of the alignment of the structured light with floating image. For the case of using an LCD panel, whether SIP or non-SIP panel, the bounded region corresponding to the floating image is bound for both visible light as well as near IR light, when the IR illumination is provided within the backlight, due to the metallized boundary of the panel being opaque to both visible and IR light. However, for the case of providing IR illumination from a thin LGP placed on top of the panel, IR-blocking or IR rejecting masking may be used to match the boundary of the floating image in order to maintain auto-alignment of the IR illumination with floating image content region. Further, while the case of using SIP enables an array of sensors effectively and inherently aligned to the floating image, no stereo or 3D sensing is required, and touch may be determined by processing an image to determine if interactive object size and peak irradiance and/or profile match criteria to indicate a touch event based on proximity of the object and post-process software filtering. To further enhance touch detection, IR illumination light may be structured across position at the floating image by use of an IR-absorbing masking at a plane in close proximity to the display content plane corresponding to the floating image, such that the masking is patterned. In such case, the patterning will be in focus only when an object is in close proximity to the floating image, thus the known patterning across position may be used to determine proximity of an object to floating image plane by post-process software filtering for images interactive object images having such overlay structured content. When an interactive object (touch, etc.) is beyond close proximity to the floating image plane, this structure may be defocussed, or blurred, and thus may be determined to be not at the floating image plane, thus not a touch or interactive event.

Figure 5A:
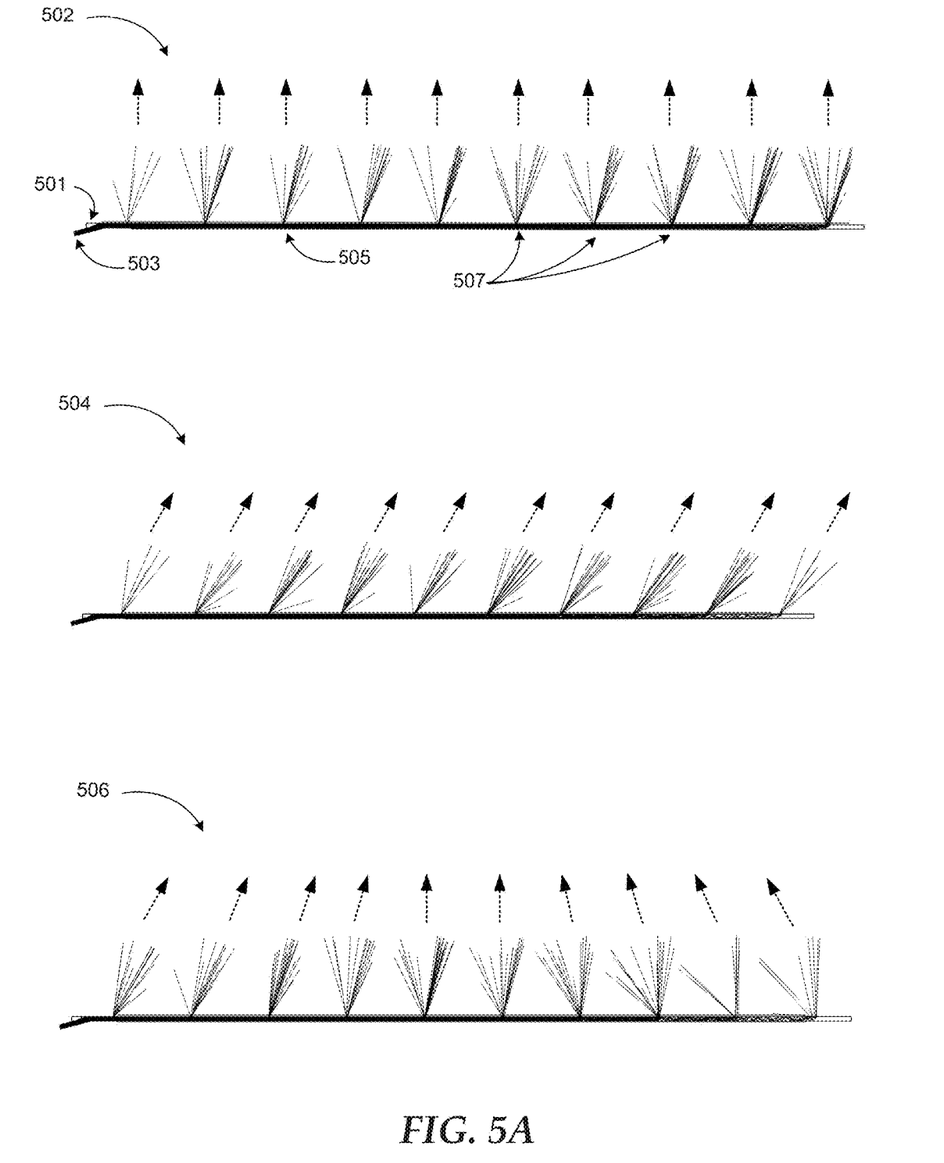
FIG. 5A illustrates example IR illumination outputs that may be implemented to enable interactive sensing for floating images when employed in conjunction with stereo vision.

FIG. 5A illustrates example IR illumination outputs that may be implemented to enable interactive position sensing.

In diagram 500, examples of a telecentric output 502, an angular output 504, and an overlapping (converging) output 506 for IR illumination are shown. Telecentric output 502 includes illustration of ray traces from light guide 505 in a normal direction to the display. The light guide 505 may receive light from an LED input 503 through a concentrator 501. Embedded partially reflective facets 507 may provide uniform output extraction versus position along the propagation direction of light guide 505. The example diagram shows ten embedded facets across a length of the light guide 505, for illustration purposes. In practical implementations, the spacing may be substantially smaller between extraction features in order to maintain uniformity on a local scale as well as macro scale across the light guide 505.

By controlling an angle versus position of the partially reflective layer, the light guide 505 may also be configured to direct the light a divergent direction from the display or an interstitially-spaced multiple angular bias across the display. The concentrator 501 may include various types such as an expanding taper, a reverse taper, a one-dimensional parabolic concentrator, a two-dimensional parabolic concentrator, a trumpet profile, or other profiles.

If flood light is used at the display without structure, the re-converged floating IR image may have a peak irradiance which may drop off with defocus at a rate based on the spreading or divergence due to numerical aperture profile of the light. By adding structure to the IR light at the display plane, the black gaps (void of light) may provide an increased z-localized sensitivity due to an increased rate of change of peak irradiance near focus. The sensitivity increase may be up to a point at which the features are defocused and overlapping with adjacent structured features, beyond which the trend may follow a similar roll-off as the flood light case.

Figure 5B:
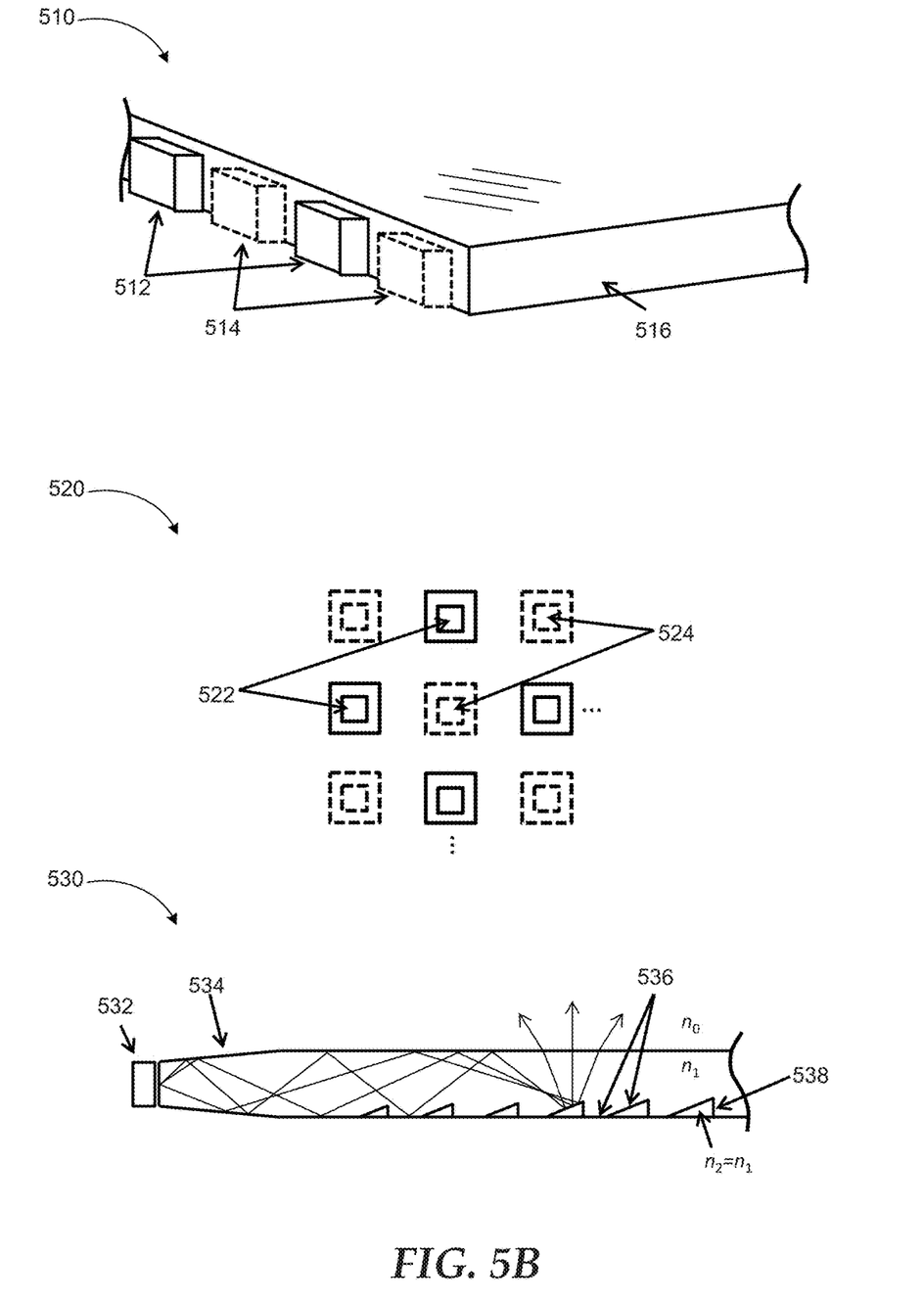
FIG. 5B illustrates various example options for IR illumination.

FIG. 5B illustrates various example options for IR illumination.

Possible options may include (1) delivery of both white backlight and NIR lighting through a common optical path, such as a backlight stack including a single LGP (light guide plate), (2) delivery of NIR light through an additional NIR-only LGP, which may be transparent to visible white light, and able to be placed in the optical path within white light backlight stack and (3) common or discrete delivery of visible white light for floating image and NIR illumination light, but providing, for the NIR light output, either (a) structured light output or (b) wavelength selective output such as wavelength-dependent holographic extraction which may further be angle-dependent. Structured light may be either of two types, including (1) incoherent light which is patterned in spatial domain, as by masking, at or near the object display plane, such as a grid array or pseudo-random array of features such as lines or dots, such that the image of this pattern converges in close proximity to the plane of the floating image, or (2) coherent light that is patterned in spatial and/or angle domain, and may have a large depth of focus, and be in focus within and beyond close proximity of the floating image plane.

It should be noted that for the case of using structured light across the spatial domain of object plane, one option may be to use a single camera, instead of stereo pair of cameras, in conjunction with the structured light, if image processing and filtering is used to determine the presence of the structure within the vision image content, as by spatial frequency analysis of the image compared to the known structured pattern. In this case, the proximity of the interactive object to the floating image plane may be determined by the level of contrast of the spatial frequency of the known structured pattern overlaying the image of camera, where presence of the pattern and the level of contrast of that pattern indicates proximity of the interactive object to the floating image plane. In such a case, lack of presence of the overlay pattern of structure may indicate that there are no interactive objects within close proximity of the floating image plane, and high contrast overlay of structure within image content may indicate object is within close proximity of floating image plane.

Diagram 510 is an example of LGP-based backlight having interstitially spaced IR LEDs 514 and white LEDs 512 along the input face of LGP 516 with extraction features. Diagram 520 is an example of an LED array-based backlight having grid of interstitially spaced IR LEDs 524 and white LEDs 522. In some implementations, the IR LEDs may include optics to further concentrate and or limit angular output of IR light to have reduced angular extent in order to avoid overlap of direct illumination with reconvergent IR illumination at the floating image plane.

Diagram 530 is an example of an IR light guide illuminator which may be used as a frontlight or added within backlight stack. The light guide may include a reverse taper or concentrator 534 near the IR LED 532. Internal surface of the light guide may be embedded with IR-reflect/visible-transmit coating 536. Relief sidewalls 538 may not be coated, which may be achieved by geometric shadowing in coating setup and geometry. Matching index media fill may enable the coating to become embedded within the light guide, and reduce visibility of artifacts impacting visible display light. Lamination to a substrate below the LGP may be possible by use of the IR-reflect/visible-transmit coating on guide lower surface which serves to reflect and prevent leakage IR light into the substrate laminated below, or by use of a low index isolation layer between LGP and lower substrate. Uniformity of the extracted light across the LGP may be achieved by varying either a fill factor of the embedded IR-reflect/visible-transmit facets versus position for a given spacing, or by varying a density of embedded reflectors vs position.

The output may include an angular bias across position by changing the tilt angle of embedded reflectors vs position, such that IR light extracted may be one of the following: telecentric, left or right angularly biased, in or out angularly biased in a dimension orthogonal to propagation dimension along guide by applying a compound angle to the embedded reflectors, converging vs position across LGP as by change of tilt angle vs position, or diverging vs position across LGP as by a change of tilt angle vs position.

Figure 5C:
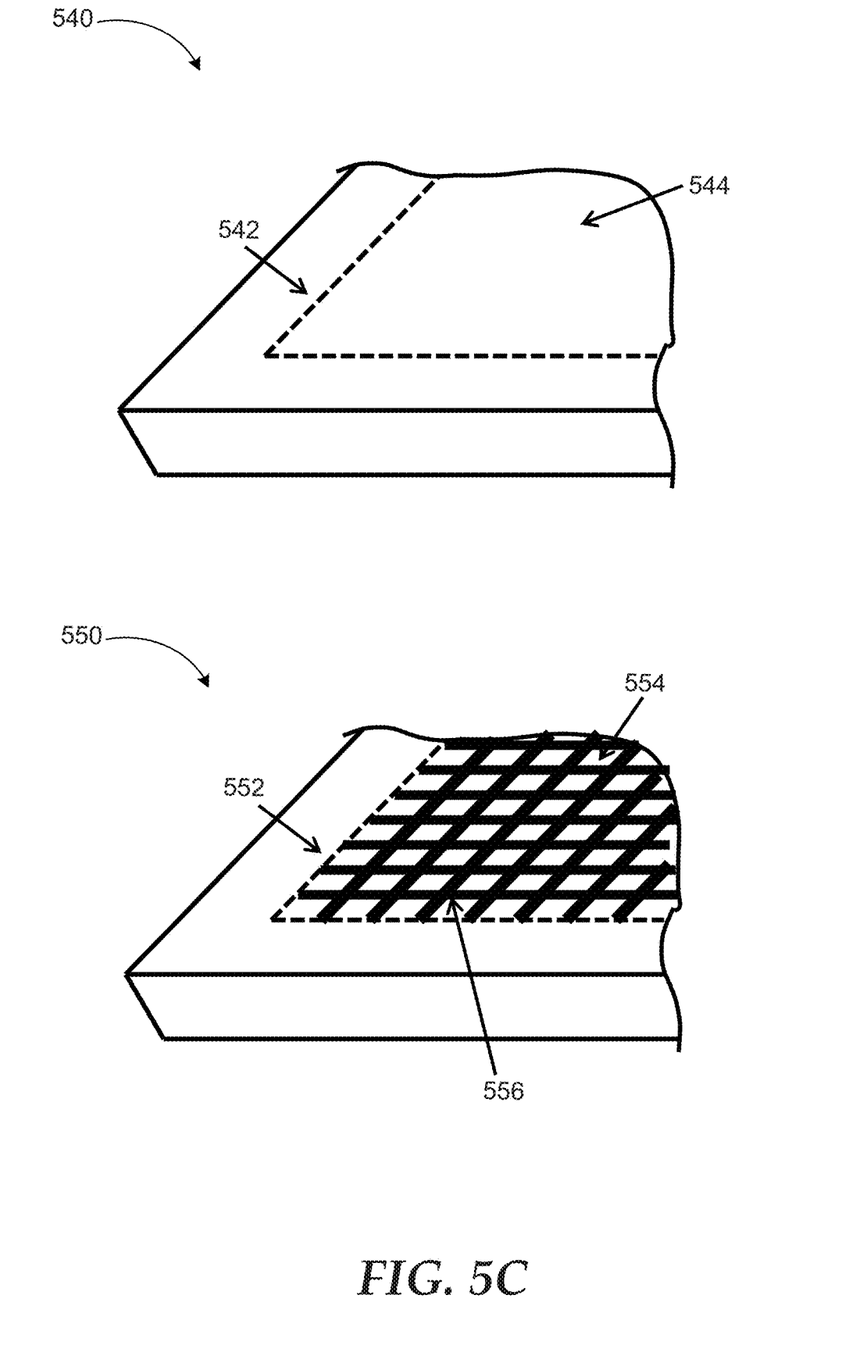
FIG. 5C illustrates example configurations for flood vs. structured light in position space.

FIG. 5C illustrates example configurations for flood versus structured light in position space.

As shown in diagram 540, an LCD-based display may be partially transparent to IR light within the active display region 544, and inherently masked by opaque borders 542 outside active display region 544. By adding patterned ink, as shown in diagram 550, which may absorb IR but transmit visible light, such as IR-absorb/visible-transmit ink or compounded polymer film having IR absorbing dye, over the active display region 554 (or a layer near and below display panel layer within backlight optical stack after the IR illuminator), such pattern may be reconverged at the floating image plane as structured illumination light across position. The pattern 556 may include a regular grid pattern or array of grid lines or array of dots, or may be pseudo-random, or a completely randomized pattern.

Figure 5D:
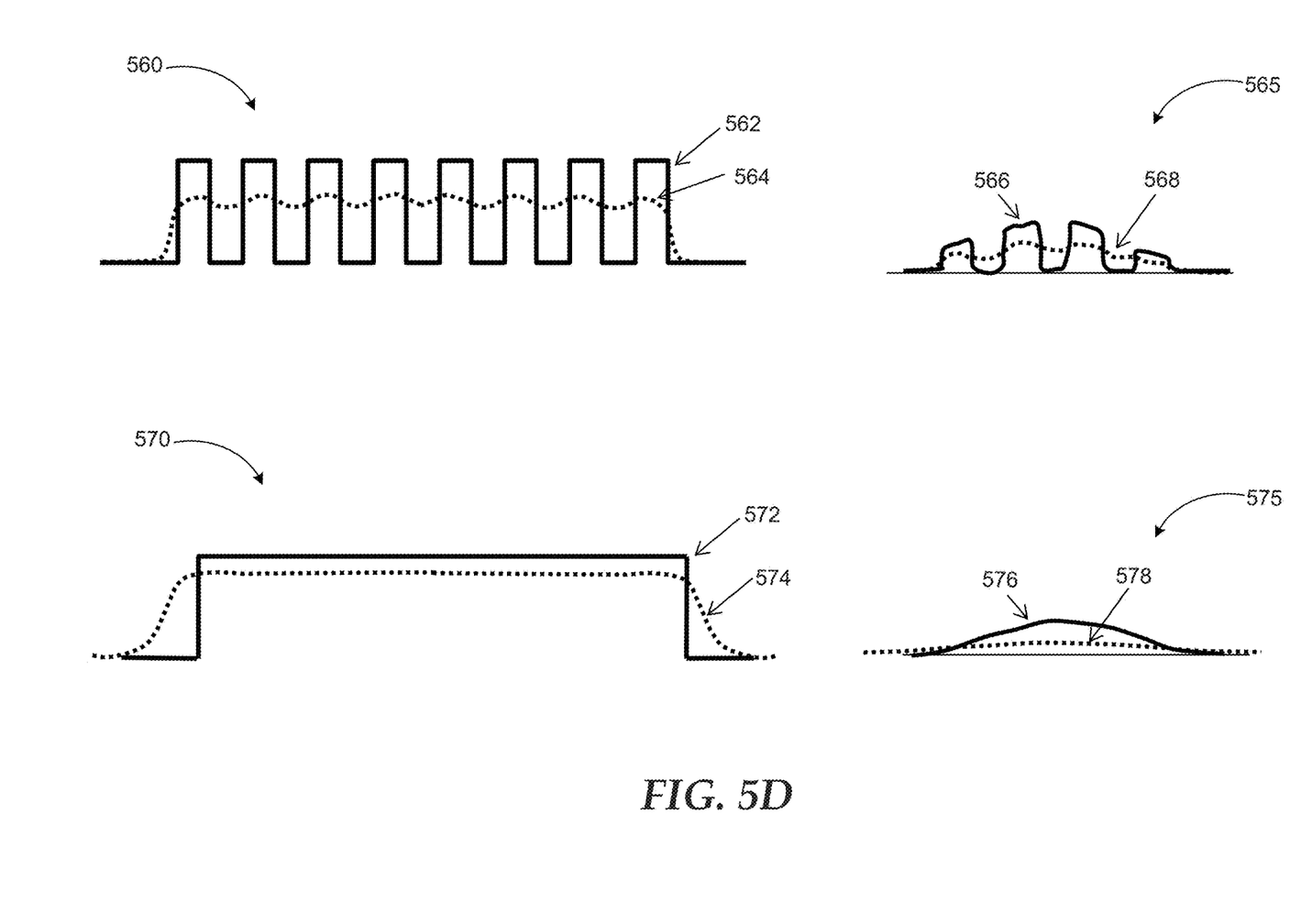
FIG. 5D illustrates example diagrams of flood vs. structured light in position space.

FIG. 5D illustrates example diagrams of flood vs. structured light in position space.

If flood light is used at the display without structure, then the reconverged 'floating' IR image may have a peak irradiance which drops off with defocus at a rate based on the spreading or divergence due to NA profile of light. By adding structure to the IR light at the display plane, the black gaps, void of light, may provide an increased sensitivity to z due to an increased rate of change of peak irradiance near focus, up to the point at which the features are defocussed and overlapping with adjacent structured features. Beyond that point the trend may follow similar roll-off as the flood case.

Diagrams 560 and 565 show a region illuminated by structured light and a corresponding example profile of a touch near floating image plane, having structure. Thus, the structured light 562 in diagram 560 may provide best focus compared to the slight defocus 564. In diagram 565, the peak 566 is near focus compared to the defocus 568. In the example scenario of diagram 560, a single camera (instead of stereo pair) and post-processing of the vision image content may be used to determine whether or not an interactive object is within close proximity of the floating image plane by determining the level of contrast in the structured light pattern overlaying the vision image content. Images containing object content, which further contains a level of contrast of the pattern, may be within close proximity of the floating image plane.

Diagrams 570 and 575 show a region illuminated by flood light with best focus 572 and slightly defocus 574 locations, as well as the example profile of a touch in diagram 575 with near focus 576 and defocus 578 areas.

The examples in FIG. 1 through 5D have been described with specific systems including specific apparatuses, components, component configurations, and component tasks. Implementations are not limited to systems according to these example configurations. Enablement of interactive position sensing by employing auto-aligned IR illumination in conjunction with stereo vision may be implemented in configurations using other types of systems including specific apparatuses, components, component configurations, and component tasks in a similar manner using the principles described herein.

Figure 6:
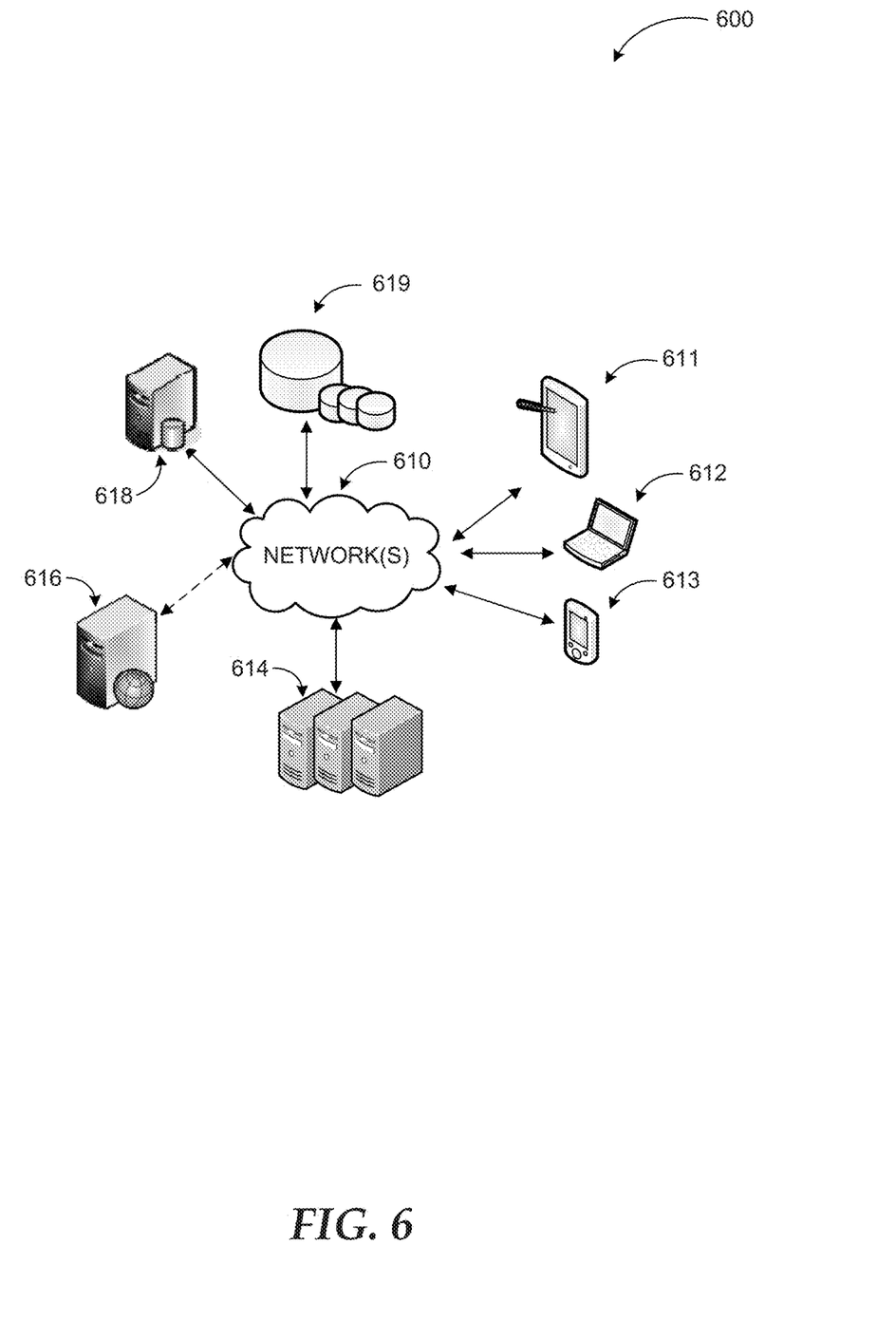
FIG. 6 is a networked environment, where a system according to implementations may be implemented.

FIG. 6 is an example networked environment, where implementations may be implemented. A system to provide interactive sensing for floating images through employment of auto-aligned IR illumination in conjunction with stereo vision may be implemented via software executed over one or more servers 614 such as a hosted service. The platform may communicate with client applications on individual computing devices such as a smart phone 613, a tablet computer 611, a laptop computer 612, or desktop computer ('client devices') through network(s) 610.

Client applications executed on any of the client devices 611-613 may facilitate communications via application(s) executed by servers 614, or on individual server 616. A retro-reflective imaging application executed on one of the servers may include an interactive sensing module. The interactive sensing module may be configured to provide interactive position sensing for floating images to one or more users through employment of auto-aligned IR illumination in conjunction with stereo vision. In an example implementation, the interactive sensing module may be configured to provide infrared (IR) illumination from the illumination source to the display plane through the optical path to automatically align a region of the IR illumination and a region of the floating image, and provide position sensing of the floating image through the one or more sensors employing stereo vision to enable user interaction with the floating image in response to the one or more sensors detecting the aligned region of the IR illumination. The interactive sensing module 114 may also enable reconvergence of the IR illumination and visible display content at a common floating image plane through the automatic alignment of the region of the IR illumination and the region of the floating image. The retro-reflective imaging application may retrieve relevant data from data store(s) 619 directly or through database server 618, and provide requested services (e.g. interactive sensing) to the user(s) through client devices 611-613.

Network(s) 610 may comprise any topology of servers, clients, Internet service providers, and communication media. A system according to implementations may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement interactive sensing in retro-reflective imaging applications. Furthermore, the networked environments discussed in FIG. 6 are for illustration purposes only. Implementations are not limited to the example applications, modules, or processes.

Figure 7:
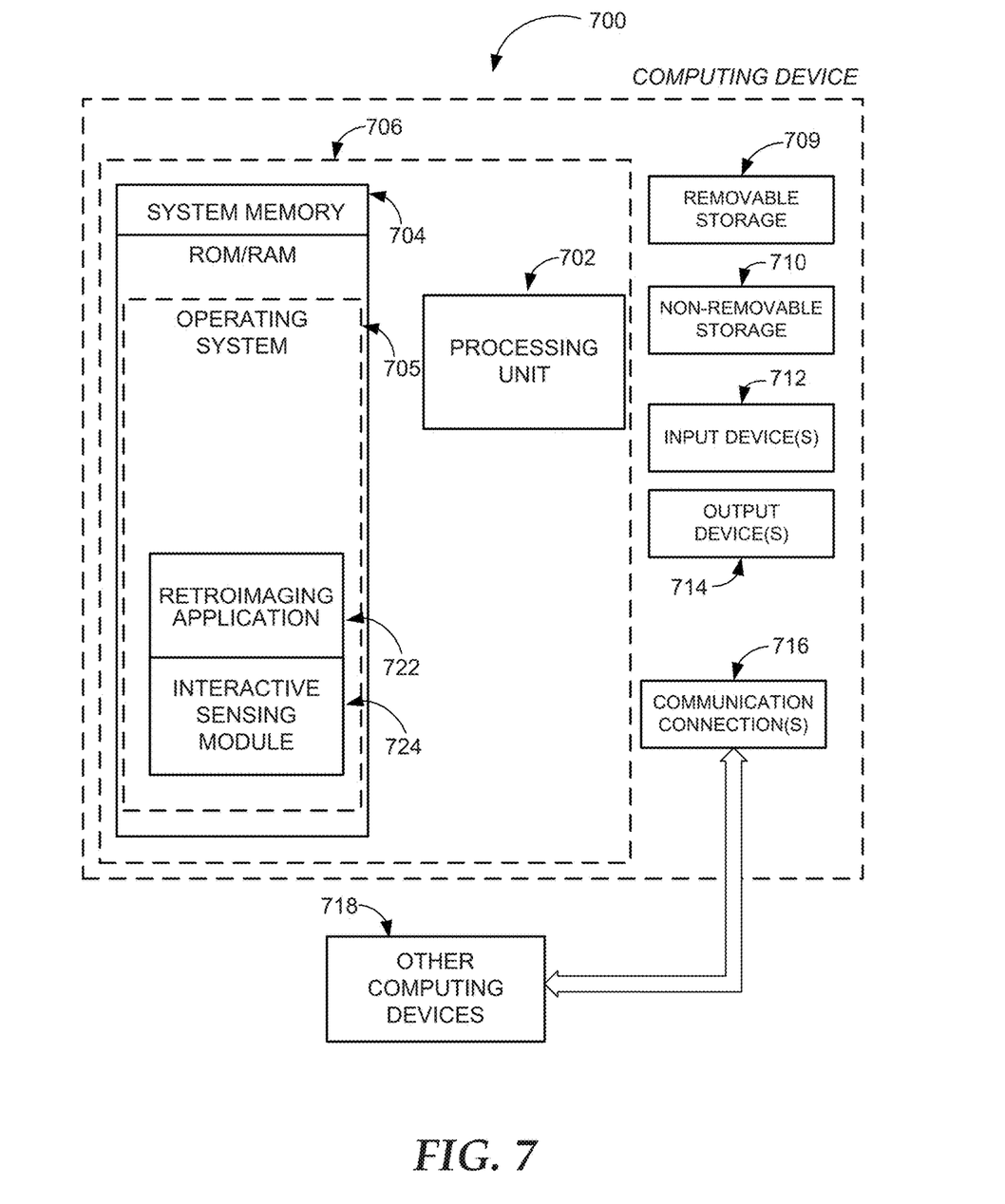
FIG. 7 is a block diagram of an example computing operating environment, where implementations may be implemented.

FIG. 7 and the associated discussion are intended to provide a brief, general description of a suitable computing environment in which implementations may be implemented. With reference to FIG. 7, a block diagram of an example computing operating environment for an application according to implementations is illustrated, such as computing device 700. In a basic configuration, computing device 700 may be any portable computing device with wireless communication capabilities, which may include touch and/or gesture detection capability in some examples, and include at least one processing unit 702 and system memory 704. Computing device 700 may also include multiple processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS®, WINDOWS MOBILE®, WINDOWS RTO, or WINDOWS PHONE®, and similar operating systems from MICROSOFT CORPORATION of Redmond, Wash. The system memory 704 may also include one or more software applications such as a retro-reflective imaging application 722, and an interactive sensing module 724.

The retro-reflective imaging application 722 may provide interactive position sensing to one or more users through the interactive sensing module 724. The interactive sensing module 724 may perform actions such as providing infrared (IR) illumination to the display plane through the optical path to automatically align a region of the IR illumination and a region of the floating image. An imaging or graphics processor may provide a signal to the sensing module 724 to control actions of the interactive sensing module 724. The example method may further include providing position sensing of the floating image through a sensor employing stereo vision to enable user interaction with the floating image in response to the sensor detecting the aligned region of the IR illumination. In other implementations, the interactive sensing module 724 may perform actions including projecting infrared (IR) light into a display, where the IR light is partially transmitted through a panel of the display, scattered, and reflected back from an active region of the panel, wherein the active region is a region of the IR light aligned with a region of a floating image. Furthermore, the active region of the panel may be used to register the floating image with one or more sensors associated with the display. The retro-reflective imaging application 722 and interactive sensing module 724 may be separate applications or integrated modules of a hosted service. This basic configuration is illustrated in FIG. 7 by those components within dashed line 706.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Some implementations may be implemented in a computing device that includes a communication module, a memory device, and a processor, where the processor executes a method as described above or comparable ones in conjunction with instructions stored in the memory device. Other implementations may be implemented as a computer readable memory device with instructions stored thereon for executing a method as described above or similar ones. Examples of memory devices as various implementations of hardware are discussed above.

Computing device 700 may also contain communication connections 717 that allow the device to communicate with other devices 717, such as over a wired or wireless network in a distributed computing environment, a satellite link, a cellular link, a short range network, and comparable mechanisms. Other devices 717 may include computer device(s) that execute communication applications, web servers, and comparable devices. Communication connection(s) 717 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example implementations also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
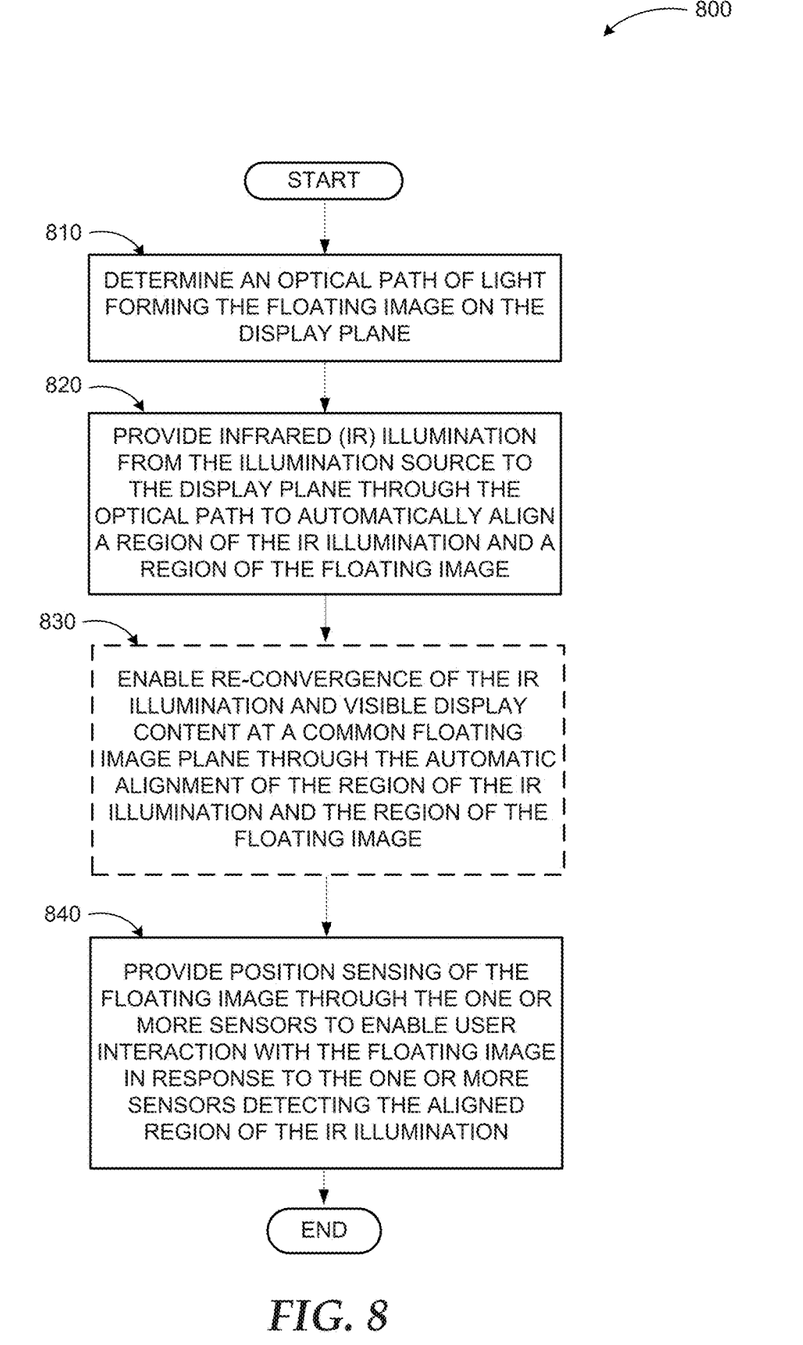
FIG. 8 illustrates a logic flow diagram of a method to provide interactive sensing for floating images, according to implementations.

FIG. 8 illustrates a logic flow diagram of a method to provide interactive sensing for floating images according to implementations. Process 800 may be implemented on a server or other system.

Process 800 begins with operation 810, where a processor of an interactive sensing for floating images system may determine an optical path of light forming the floating image on the display plane. At operation 820, an illumination source of the system controlled by the processor may provide infrared (IR) illumination from the illumination source to the display plane through the optical path to automatically align a region of the IR illumination and a region of the floating image.

At optional operation 830, the processor may enable re-convergence of the IR illumination and visible display content at a common floating image plane through the automatic alignment of the region of the IR illumination and the region of the floating image. At operation 840, the processor may provide position sensing of the floating image through the one or more sensors to enable user interaction with the floating image in response to the one or more sensors detecting the aligned region of the IR illumination. Light reconverges at floating image plane first, then a portion of reconverged NIR light may be diffusely reflected from interactive objects, such as fingers, into the acceptance of the vision systems in order to detect position of interactive objects relative to floating image in order to enable interaction with floating image content. The one or more sensors may include two offset stereo vision cameras in conjunction with non-structured light, a single camera in conjunction with structured light, or a sensor-in-pixel (SIP) array in conjunction with unstructured light.

The operations included in process 800 are for illustration purposes. Providing interactive sensing in retro-reflective imaging applications may be implemented by similar processes with fewer or additional steps, as well as in different order of operations using the principles described herein.

According to some examples, a method is described. The method may include determining an optical path of light forming a floating image on a display plane; providing infrared (IR) illumination to the display plane through the optical path to automatically align a region of the IR illumination and a region of the floating image; and providing position sensing of the floating image through a sensor employing stereo vision to enable user interaction with the floating image in response to the sensor detecting the aligned region of the IR illumination.

According to other examples, providing the IR illumination may include flooding the display plane with IR light or illuminating the display plane with structured light. The structured light may be structured in one of a position space and an angle space. The method may further include employing one or more IR absorbing dyes printed over an illumination layer to provide the structured light in the position space. The method may also include employing an IR laser to provide the structured light in the angle space. The method may yet include mitigating distortion created by the stereo vision by employing off-set imaging or rectilinear imaging. Employing the off-set imaging may include employing one of transmissive or reflective optics. Employing the rectilinear imaging may include employing a Theia lens.

According further examples, a computing that includes a retro-reflective display, an illumination source, one or more sensors, a memory configured to store instructions, and a processor coupled to the memory, the retro-reflective display, the one or more sensors, and the illumination source is described. The processor may be operable to execute an interactive sensing application in conjunction with the instructions stored in the memory. The interactive sensing application may be configured to determine an optical path of light forming a floating image on a display plane; provide infrared (IR) illumination from the illumination source to the display plane through the optical path to automatically align a region of the IR illumination and a region of the floating image; and provide position sensing of the floating image through the one or more sensors to enable user interaction with the floating image in response to the one or more sensors detecting the aligned region of the IR illumination.

According to yet other examples, the interactive sensing application may be configured to enable re-convergence of the IR illumination and visible display content at a common floating image plane through the automatic alignment of the region of the IR illumination and the region of the floating image. The IR illumination may be provided within a backlight unit (BLU) of the display plane. The illumination source may be a backlight unit (BLU) of the display and may be configured to provide the IR illumination by one of an interstitial placement of both IR light emitting diodes (LEDs) and white LEDs on a common delivery light guide or a separate guide for each of the white LEDs and the IR LEDs.

According to yet further examples, the interactive sensing application may be configured to correct distortion created by the stereo vision through Scheimpflug principle-based imaging. The illumination source may be configured to project an IR laser beam with diffractive optical elements (DOEs) positioned at a top center of the display pane emanating an angular output, project a divergent IR laser beam interacting with a hologram positioned at one of a beam splitter and over a display plane, or project an IR pattern in an angle space through a holographic flat lens. The holographic flat lens may be telecentric, convergent, or divergent. The floating image may be a two-dimensional (2D) image or a three-dimensional (3D) image formed using a retro-reflective array and a beam splitter. The one or more sensors may include two offset stereo vision cameras in conjunction with non-structured light, a single camera in conjunction with structured light, or a sensor-in-pixel (SIP) array in conjunction with unstructured light.

According to some examples, another method is described. The other method may include projecting infrared (IR) light into a display, where the IR light is partially transmitted through a panel of the display, scattered, and reflected back from an active region of the panel, and where the active region is a region of the IR light aligned with a region of a floating image; and employing the active region of the panel to register the floating image with one or more sensors associated with the display. The method may further include employing a screen or a test board with a plurality of touch points to calibrate the one or more sensors.

The above specification, examples and data provide a complete description of the manufacture and use of the composition of the implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and implementations.

What is claimed is:

1. A method comprising:
   determining an optical path of light forming a floating image on a display plane;
   providing infrared (IR) illumination to the display plane with structured light through the optical path to automatically align a region of the IR illumination and a region of the floating image, wherein the structured light is structured in one of a position space and an angle space,
   employing one or more IR absorbing dyes printed over an illumination layer in close proximity to the display plane corresponding to the floating image, to provide the structured light in the position space;
   employing a holographic flat imager to project an IR pattern in the angle space; and
   providing position sensing of the floating image through a sensor employing stereo vision to enable user interaction with the floating image in response to the sensor detecting the aligned region of the IR illumination.

2. The method of claim 1, wherein providing the IR illumination comprises: flooding the display plane with IR light.

3. The method of claim 1, comprising:
   employing an IR laser to provide the structured light in the angle space.

4. The method of claim 1, further comprising:
   mitigating distortion created by the stereo vision by employing off-set imaging or rectilinear imaging.

5. The method of claim 4, wherein employing the off-set imaging comprises:
   employing one of transmissive or reflective optics.

6. The method of claim 4, wherein employing the rectilinear imaging comprises:
   employing a rectilinear lens.

7. A computing device comprising:
   a retro-reflective display;
   an illumination source;
   one or more sensors;
   a memory configured to store instructions;
   a processor coupled to the memory, the retro-reflective display, the one or more sensors, and the illumination source, the processor operable to execute an interactive sensing application in conjunction with the instructions stored in the memory, wherein the interactive sensing application is configured to:
      determine an optical path of light forming a floating image on a display plane;
      provide infrared (IR) illumination from the illumination source to the display plane with structured light through the optical path to automatically align a region of the IR illumination and a region of the floating image, wherein the structured light is structured in one of a position space and an angle space, wherein
      employ one or more IR absorbing dyes printed over an illumination layer in close proximity to the display plane corresponding to the floating image, to provide the structured light in the position space, and
      employ a holographic flat imager to project an IR pattern in the angle space; and
      provide position sensing of the floating image through the one or more sensors to enable user interaction with the floating image in response to the one or more sensors detecting the aligned region of the IR illumination.

8. The computing device of claim 7, wherein the interactive sensing application is configured to enable re-convergence of the IR illumination and visible display content at a common floating image plane through the automatic alignment of the region of the IR illumination and the region of the floating image.

9. The computing device of claim 7, wherein the IR illumination is provided within a backlight unit (BLU) of the display plane.

10. The computing device of claim 7, wherein the illumination source is a backlight unit (BLU) of the display and is configured to provide the IR illumination by one of an interstitial placement of both JR light emitting diodes (LEDs) and white LEDs on a common delivery light guide or a separate guide for each of the white LEDs and the IR LEDs.

11. The computing device of claim 7, wherein the interactive sensing application is configured to correct distortion created by the stereo vision through Scheimpflug principle-based imaging.

12. The computing device of claim 7, wherein the illumination source is configured to one of:
    project an IR laser beam with diffractive optical elements (DOEs) positioned at a top center of the display pane emanating an angular output; and
    project a divergent IR laser beam interacting with a hologram positioned at one of a beam splitter and over a display planet.

13. The computing device of claim 7, wherein the holographic flat lens is one of telecentric, convergent, or divergent.

14. The computing device of claim 7, wherein the floating image is one of a two-dimensional (2D) image or a three-dimensional (3D) image formed using a retro-reflective array and a beam splitter.

15. The computing device of claim 7, wherein the one or more sensors include two offset stereo vision cameras in conjunction with non-structured light, a single camera in conjunction with structured light, and a sensor-in-pixel (SIP) array in conjunction with unstructured light.

16. A method comprising:
    projecting structured infrared (IR) light into a display, wherein
       the IR light is partially transmitted through a panel of the display, scattered, and reflected back from an active region of the panel,
       the structured IR light is structured in one of a position space and an angle space, and
       the active region is a region of the IR light aligned with a region of a floating image;
    employing one or more IR absorbing dyes printed over an illumination layer in close proximity to the panel corresponding to the floating image, to provide the structured IR light in the position space;
    employing a holographic flat imager to project an IR pattern in the angle space; and
    employing the active region of the panel to register the floating image with one or more sensors associated with the display.

17. The method of claim 16, further comprising:
    employing one of a screen or a test board with a plurality of touch points to calibrate the one or more sensors.

* * * * *